(12) United States Patent
Formentini

(10) Patent No.: US 11,833,499 B2
(45) Date of Patent: Dec. 5, 2023

(54) METHOD FOR REVAMPING A CATALYTIC CONVERTER

(71) Applicant: CASALE SA, Lugano (CH)

(72) Inventor: Francesco Formentini, Casciago (IT)

(73) Assignee: CASALE SA, Lugano (CH)

( * ) Notice: Subject to any disclaimer, the term of this patent is extended or adjusted under 35 U.S.C. 154(b) by 0 days.

(21) Appl. No.: 17/436,365

(22) PCT Filed: Feb. 18, 2020

(86) PCT No.: PCT/EP2020/054183
§ 371 (c)(1),
(2) Date: Sep. 3, 2021

(87) PCT Pub. No.: WO2020/178019
PCT Pub. Date: Sep. 10, 2020

(65) Prior Publication Data
US 2022/0161215 A1 May 26, 2022

(30) Foreign Application Priority Data
Mar. 6, 2019 (EP) ..................................... 19161126

(51) Int. Cl.
*B01J 8/00* (2006.01)
*B01J 8/04* (2006.01)
*C01C 1/04* (2006.01)

(52) U.S. Cl.
CPC ............. *B01J 8/0015* (2013.01); *B01J 8/008* (2013.01); *B01J 8/0469* (2013.01); *B01J 8/0496* (2013.01);
(Continued)

(58) Field of Classification Search
CPC ... B01J 8/00; B01J 8/0015; B01J 8/008; B01J 8/02; B01J 8/04; B01J 8/0446;
(Continued)

(56) References Cited

U.S. PATENT DOCUMENTS 6,916,453 B2 *   7/2005   Filippi ..................... B01J 8/025
                                                               422/198
9,687,801 B2 *   6/2017   Rizzi ..................... C01C 1/0423

FOREIGN PATENT DOCUMENTS

EP          0376000 A1     7/1990
WO       2008074496 A1     6/2008
(Continued)

OTHER PUBLICATIONS

International Preliminary Report on Patentability for International Application No. PCT/EP2020/054183 dated Jul. 1, 2021.
(Continued)

*Primary Examiner* — Natasha E Young
(74) *Attorney, Agent, or Firm* — Dorsey & Whitney LLP

(57) ABSTRACT

A method for revamping a catalytic converter wherein: said catalytic converter comprises a pressure vessel and a catalytic cartridge containing at least one catalyst bed, the pressure vessel includes a cylindrical shell with a full aperture and includes a removable cover of said aperture, and the catalytic cartridge is removable through said upper aperture, and the method includes: installing an additional shell over the aperture of the original shell, thus obtaining an axially extended shell of the pressure vessel; providing an axially extended catalytic cartridge having an axially extended room for holding catalyst in the so obtained axially extended shell.

16 Claims, 3 Drawing Sheets

(52) U.S. Cl.
CPC ............... *B01J 2208/00814* (2013.01); *B01J 2219/00024* (2013.01); *C01C 1/0405* (2013.01)

(58) Field of Classification Search
CPC ...... B01J 8/0461; B01J 8/0469; B01J 8/0496; B01J 19/00; B01J 19/24; B01J 2208/00; B01J 2208/00796; B01J 2208/00805; B01J 2208/00814; B01J 2219/00; B01J 2219/00002; B01J 2219/00018; B01J 2219/00024; C01C 1/00; C01C 1/02; C01C 1/04; C01C 1/0405
See application file for complete search history.

(56) References Cited

FOREIGN PATENT DOCUMENTS

| | | |
|---|---|---|
| WO | 2014090841 A2 | 6/2014 |
| WO | 2019023655 A1 | 1/2019 |

OTHER PUBLICATIONS

International Search Report and Written Opinion from International Application No. PCT/EP2020/054183 dated Apr. 29, 2020.

\* cited by examiner

METHOD FOR REVAMPING A CATALYTIC CONVERTER

This application is a U.S. national stage application of PCT International Application No. PCT/EP2020/054183, now WO2020178019, filed on Feb. 18, 2020, which claims priority to European Patent Application No. EP19161126.8, filed on Mar. 6, 2019.

FIELD OF APPLICATION

The present invention relates to a method for revamping a converter containing at least one catalyst bed in a catalytic cartridge.

PRIOR ART

A catalytic converter includes basically a pressure vessel with a main axis and a catalytic cartridge containing at least one catalyst bed. The pressure vessel has a cylindrical shell with a main aperture. Said main aperture of the shell may be large enough to insert and possibly remove the catalytic cartridge from the vessel. In such a case, the pressure vessel is termed open vessel. For example an open top vertical converter has an upper aperture with the same diameter or substantially the same diameter as the shell.

The catalytic cartridge identifies a self-standing component which includes one or more catalyst beds. A cartridge may include also inter-bed heat exchanger, i.e. heat exchangers arranged to cool the effluent of a bed before it enters the next bed. Inter-bed cooling may be necessary to avoid damage of the catalyst, especially in the presence of a strong exothermic reaction.

An inter-bed heat exchanger transfers heat from the effluent of a catalyst bed to a cooling medium by indirect (i.e. without mixing) heat exchange. The cooling medium may be a fresh gas charge or water/steam according to various embodiments. Use of a fresh gas charge as a cooling medium allows preheating the gas charge with heat removed from the effluent.

A cartridge normally includes features to properly distribute and collect the gaseous reagents and products to/from the catalyst beds and heat exchangers. In a common embodiment, a cartridge comprises an inner collector and an outer collector embodied as gas-permeable walls to for distributing gaseous reagents and collecting gaseous products to/from each catalyst bed.

Each catalytic bed is generally contained within a suitable basket. The basket comprises the suitable means to retain the catalyst. Accordingly the catalytic cartridge may comprise several baskets, including one basket of each catalytic bed. The catalyst is normally in a granular or pellet form.

A known setup of a multi-bed converter, for example, includes a cartridge with two or three catalyst beds aligned one next to the other. The cartridge includes one or more inter-bed heat exchangers. The catalyst beds have typically an annular cylindrical shape and are traversed by an axial, radial or mixed axial-radial flow. An inter-bed heat exchanger may be a tube heat exchanger fitted in the centre of the annular bed. A three-bed setup may include first, intermediate and last catalyst beds; a first heat exchanger between the first bed and the intermediate bed, and a second heat exchanger between the intermediate bed and the last bed. Another common embodiment has a quench after the first bed and one or more heat exchangers after the following beds.

Alternatively to inter-bed heat exchange, a cartridge may feature a gas quenching wherein a hot effluent is mixed with a gaseous stream at a lower temperature, e.g. a portion of fresh gaseous charge.

A heat exchanger may also be immersed in the catalyst. In that case, the catalyst bed is termed isothermal because the temperature of the catalyst can be maintained within a target range.

A vertical converter as above described is popular, among others, as a reactor for the synthesis of ammonia. A description of an ammonia vertical converter can be found e.g. in EP 0 376 000.

There is a strong interest in a method for revamping said converters, due to the large number of units currently in operation (e.g. in the ammonia or methanol plants). Particularly, the revamping of such converters is often aimed to increase the capacity of the converter. The term capacity denotes the output (e.g. tons/day of ammonia or methanol) that can be produced by the converter.

Increasing the capacity normally requires the provision of a greater quantity of catalyst compared to the original design. However the accommodation of a additional catalyst in the existing cartridge is generally not possible. In most cases, the existing cartridge has a very limited or no spare volume available for such additional catalyst. Replacing an existing converter with a larger one is generally a too expensive option in the context of a revamping. Therefore, the prior art does not offer an attractive solution to this need.

WO 2019/023655 discloses a method for revamping vertical converters which have a flanged pressure shell extension for housing a heat exchanger, by replacing the pressure shell extension with a larger extension capable of housing two or more heat exchangers.

SUMMARY OF THE INVENTION

The purpose of the present invention is to solve the above problem and to provide a cost-effective method for revamping a catalytic converter. Particularly, the invention aims to a method for revamping the converter allowing the increase of the available volume of catalyst.

This aim is reached with a method according to the attached claims. The method includes:
a) installing an additional shell on the flange of the full aperture of the original shell, thus obtaining an axially extended shell of the pressure vessel;
b) providing an axially extended catalytic cartridge having an axially extended room for holding catalyst in the so obtained axially extended shell.

The step b) provides added room for catalyst. According to the invention, the added room obtained at step b) is used for adding catalyst. Accordingly a method according to the invention may comprise the step of adding catalyst into the additional room provided by the axially extended cartridge.

The additional room for catalyst, provided by the axially extended cartridge, may extend over the full diameter of the original cartridge and therefore extends substantially over the entire diameter of the pressure vessel of the catalytic converter. The idea underlying the invention is to extend the existing pressure vessel axially. Unless otherwise indicated, references to an axial direction, e.g. the terms like axial or axially, denote the main axis of the pressure vessel. The pressure vessel, to which the method of the invention is applied, may be arranged horizontally or vertically. Accordingly the main axis may be a horizontal axis or vertical axis.

The original shell of the pressure vessel and the additional shell are preferably cylindrical or substantially cylindrical.

The so obtained axially extended pressure vessel is able to accommodate a catalytic cartridge longer than the original, having therefore more room for catalyst.

In a first general embodiment of the invention, the existing cartridge is modified to accommodate additional catalyst, making use of the additional room provided by the axially extended pressure vessel. For example, the existing cartridge may be modified to contain an additional amount of catalyst and possibly a new additional catalyst bed separate from the originally provided catalyst beds.

In a second general embodiment, the exiting cartridge is removed and replaced with an axially enlarged new cartridge.

The term full aperture denotes an aperture having the same or substantially the same diameter as the internal diameter of the pressure vessel. The pressure vessel may also be termed full-opening or fully open vessel, in contrast to partially open vessel wherein the largest nozzle has a size considerably smaller than the diameter of the vessel. A vertical converter with an upper full aperture is also termed open top converter.

The full aperture of the pressure shell, where the additional shell is connected, is at least as large as the cartridge. Accordingly the aperture is large enough to allow extraction and insertion of the fully assembled catalytic cartridge.

Preferred embodiments are stated in the attached dependent claims.

The step of providing an axially extended catalytic cartridge in the axially extended shell may include the installation of an additional cartridge spool at an end portion of the existing cartridge. The cartridge spool delimits an additional volume wherein additional catalyst can be loaded, for example forming a new catalyst bed. The cartridge spool may have the same diameter as the original cartridge or a smaller diameter.

The original cartridge may have an end flange with a cover. In that case, said cover may be removed through the full aperture of the converter and the additional cartridge spool may be connected to said flange of the original cartridge.

In a vertical embodiment, said end flange is a top flange and the cartridge spool is provided over said top flange.

A preferred embodiment comprises the provision of a new catalyst bed in an end portion of the modified cartridge, particularly in the room delimited by the newly added additional cartridge spool. Accordingly a new catalyst bed may be created. In a vertical embodiment said new catalyst bed forms the top catalyst bed of the cartridge.

The original cartridge, in most cases, contains one or more baskets for containing catalyst beds. The term basket denotes the portion of the cartridge arranged to hold the catalyst of a catalyst bed which is separate from other beds of the cartridge. A basket is configured to hold the catalyst (e.g. solid catalyst particles) and allows a proper gaseous flow through the catalyst mass. A basket generally comprises load-bearing structures and gas-permeable walls for the inlet gas and for the effluent gas of the catalyst bed. The baskets may be arranged next to one another. In a vertical embodiment, for example, they are vertically arranged one above the other.

Said gas-permeable walls (also termed collectors) are preferably cylindrical walls.

The catalyst beds are traversed sequentially by the process gas. According to this sequence the catalytic beds and related baskets can be identified from a first one to a last one. The first bed receives the fresh reagents whilst the last bed gives the product gas effluent. One or more intermediate beds may be provided between the first bed and the last bed. In a vertical embodiment the beds are normally stacked one above the other. In most vertical embodiments, the first bed is the top bed and the last bed is the bottom bed.

In a preferred embodiment, the method of the invention includes the step of increasing the axial length of at least one basket of the cartridge. Accordingly, more catalyst can be loaded in the axially extended basket and the corresponding catalytic bed may be extended axially. Particularly preferably, in a multi-bed cartridge, the last basket of the cartridge (the basket of the last catalyst bed) is axially extended.

The step of axially extending a basket may include axially extending the inner collector and outer collector of the baskets.

The method of the invention may include loading catalyst in the modified cartridge for form one or more catalyst beds in the modified cartridge.

The method of the invention may include the provision of new or modified support means of the catalyst beds and related baskets. For example, an embodiment provides an additional shroud or an additional support ring for at least one catalyst bed of the modified catalytic cartridge. In an embodiment, the last bed is axially extended and new or modified support means are provided for the bed next to the said last bed.

The original catalytic cartridge may comprise one or more catalyst beds, possibly with inter-bed heat exchangers for inter-bed cooling of the gaseous effluent and/or quenching means for inter-bed quenching of the gaseous effluent.

The modified catalytic cartridge may differ from the original cartridge for the number of catalyst beds, for example including an additional catalyst bed over the top bed of the existing cartridge. The modified cartridge may also differ from the original cartridge with respect to inter-bed cooling means.

As a first example, a setup with a two-bed cartridge with one inter-bed exchanger can be modified into a three-bed cartridge with two inter-bed heat exchangers. As a second example, a setup with three beds and two inter-bed heat exchangers may be modified into four beds with a quench and two inter-bed heat exchangers. These examples are not limiting and different setups are possible. In some embodiments a single-bed converted may be transformed into a multi-bed converter.

When the existing cartridge is replaced with a new one, the method includes:
removing the original catalytic cartridge from the pressure vessel, and
installing a new catalytic cartridge within the pressure vessel, the new cartridge having axial length greater than the original cartridge.

The modified cartridge or the new cartridge may differ from the original cartridge for at least one of the following features: the number of catalyst beds which can be accommodated in the cartridge; the presence or number of inter-bed heat exchangers; the presence or number of inter-bed quenching means. The modified cartridge or the new cartridge may also comprise a so-called isothermal bed, i.e. a catalytic bed with a heat exchanger immersed in the catalyst.

The invention can be applied to converters with an axial flow, radial flow, or mixed axial-radial flow through the catalyst bed or beds.

The great advantage of the invention is that the existing pressure vessel, which is a major source of cost, is maintained, because the additional room for catalyst is provided by the additional shell. Another advantage is the option of modifying the setup of the original cartridge by providing an additional catalyst bed and/or modified inter-bed cooling means. Accordingly the invention provides a cost-effective solution to the problem of how to increase the capacity of a catalytic converter of the type herein considered. The works necessary to the method of the invention are relatively limited. Use can be made of supports originally provided in the shell. The original shell may be left substantially unaltered, as the axial extension is obtained by adding a new piece.

The advantages of the invention will emerge more clearly from the following detailed description.

DETAILED DESCRIPTION OF PREFERRED EMBODIMENTS

Figure 1:
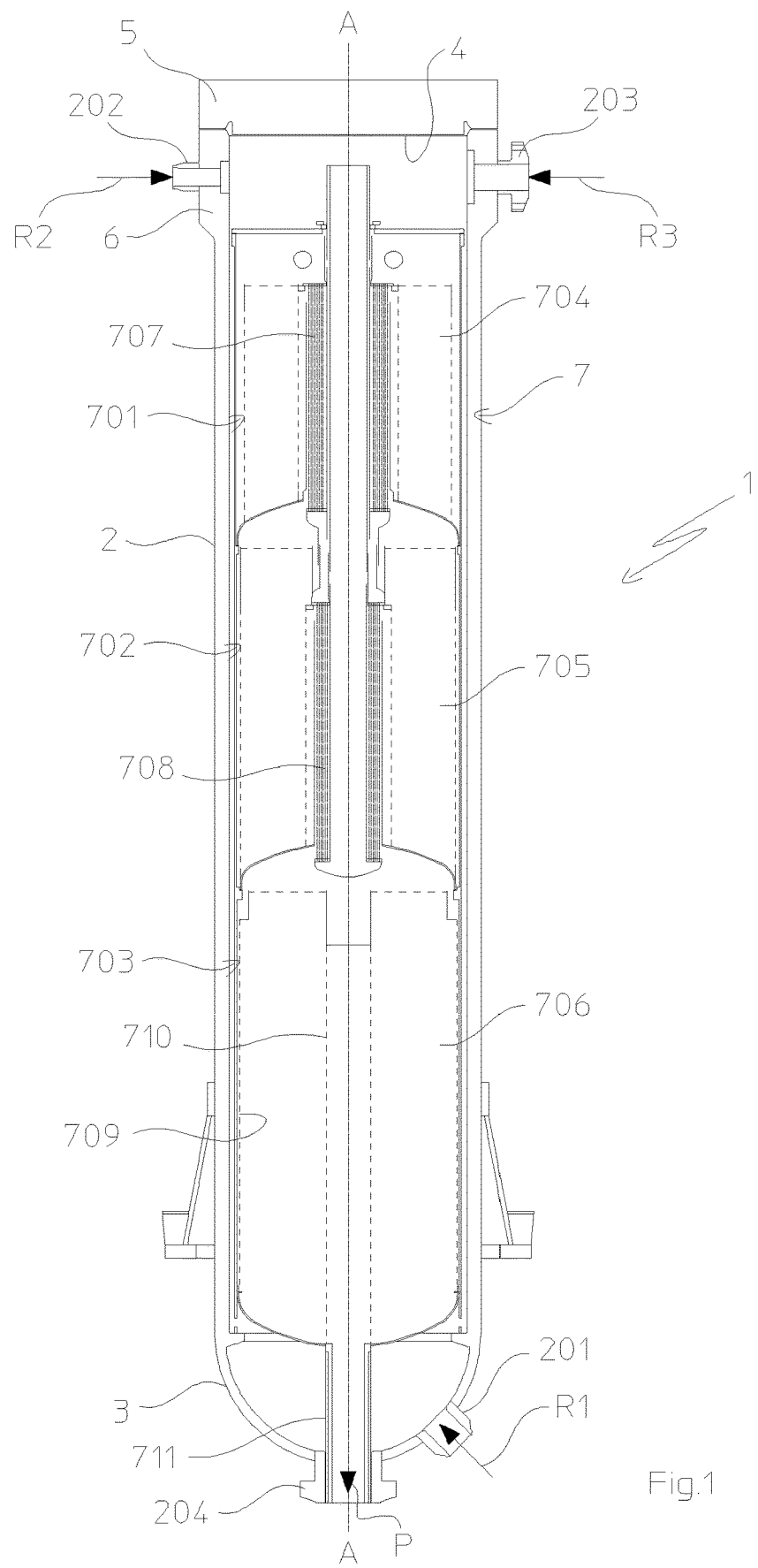
FIG. 1 is a simplified section of a vertical converter according to the prior art.

FIG. 1 illustrates a multi-bed vertical converter 1 comprising a pressure vessel having a shell 2 with a bottom closure 3, a full-diameter upper aperture 4 with a removable cover 5. The removable cover 5 is bolted to a top flange 6 of the shell 2.

The converter 1 has a main axis which in this example is a vertical axis A-A. The shell 2 is substantially cylindrical having the same axis A-A.

The converter 1 contains a catalytic cartridge 7. The cartridge 7 contains an upper basket 701, an intermediate basket 702 and a bottom basket 703, vertically aligned one above the other. Said baskets hold an upper catalyst bed 704, intermediate catalyst bed 705 and bottom catalyst bed 706 respectively.

Each of the beds 704 to 706 has a cylindrical annular shape and a radial or axial-radial flow. The radial flow may be directed towards or away from the axis A-A. In the example, the radial flow is directed towards the axis (centripetal flow).

The cartridge 7 further includes two inter-bed tube heat exchangers 707 and 708 arranged to cool the effluent of the bed 704 or 705 before it enters the next bed 705 or 706, respectively. The tube heat exchangers 707, 708 are accommodated coaxially in a free space delimited by the annular catalyst beds.

The cartridge 7 further includes means to hold and support the catalyst of the beds 704 to 706 and means to properly direct the gaseous flow to/from the catalyst beds. For example each basket includes an inner gas collector and an outer gas collector. The figure illustrates that the bottom basket 703 has an outer collector (gas inlet) 709 and an inner collector (gas outlet) 710. The inner collector 710 leads to a gas outlet duct 711.

The cartridge 7 is a self-standing unit which may be removed from the vessel 2 through the upper aperture 4. The upper aperture 4 has substantially the same diameter as the inner diameter of the vessel 2, thus providing full access to the inside of the vessel 2.

The operation of the converter 1 is basically as follows. A first reaction gas charge $R_1$ enters at the bottom input 201, is preheated while flowing in an interspace between the shell 2 and the cartridge 7, then enters the first catalytic bed 704 and traverses the catalytic beds 704, 705, 706 sequentially.

While passing from the top bed 704 to the intermediate bed 705, and from the intermediate bed 705 to the lower bed 706, the effluent gas is cooled in the shell side of the heat exchangers 707, 708. The tube side of the heat exchangers 707, 708 is traversed by a second fresh reaction gas $R_2$ from the input 202. The preheated gas $R_2$ leaving the tubes mixes with the first reaction gas $R_1$ before entering the top catalytic bed 704.

An additional charge $R_3$ of fresh reaction gas may be provided at the input flange 203 and mixed with the effluent of the first bed 704, to adjust the gas inlet temperature of the intermediate bed 705.

The gaseous product effluent P from the lower bed 706 is collected in the duct 711 and leaves the converter 1 via the bottom outlet 203. This way of operation is familiar to a skilled person. Many converters for the synthesis of ammonia from a make-up gas of nitrogen and hydrogen are realized according to the scheme of FIG. 1 or variants thereof.

Figure 2:
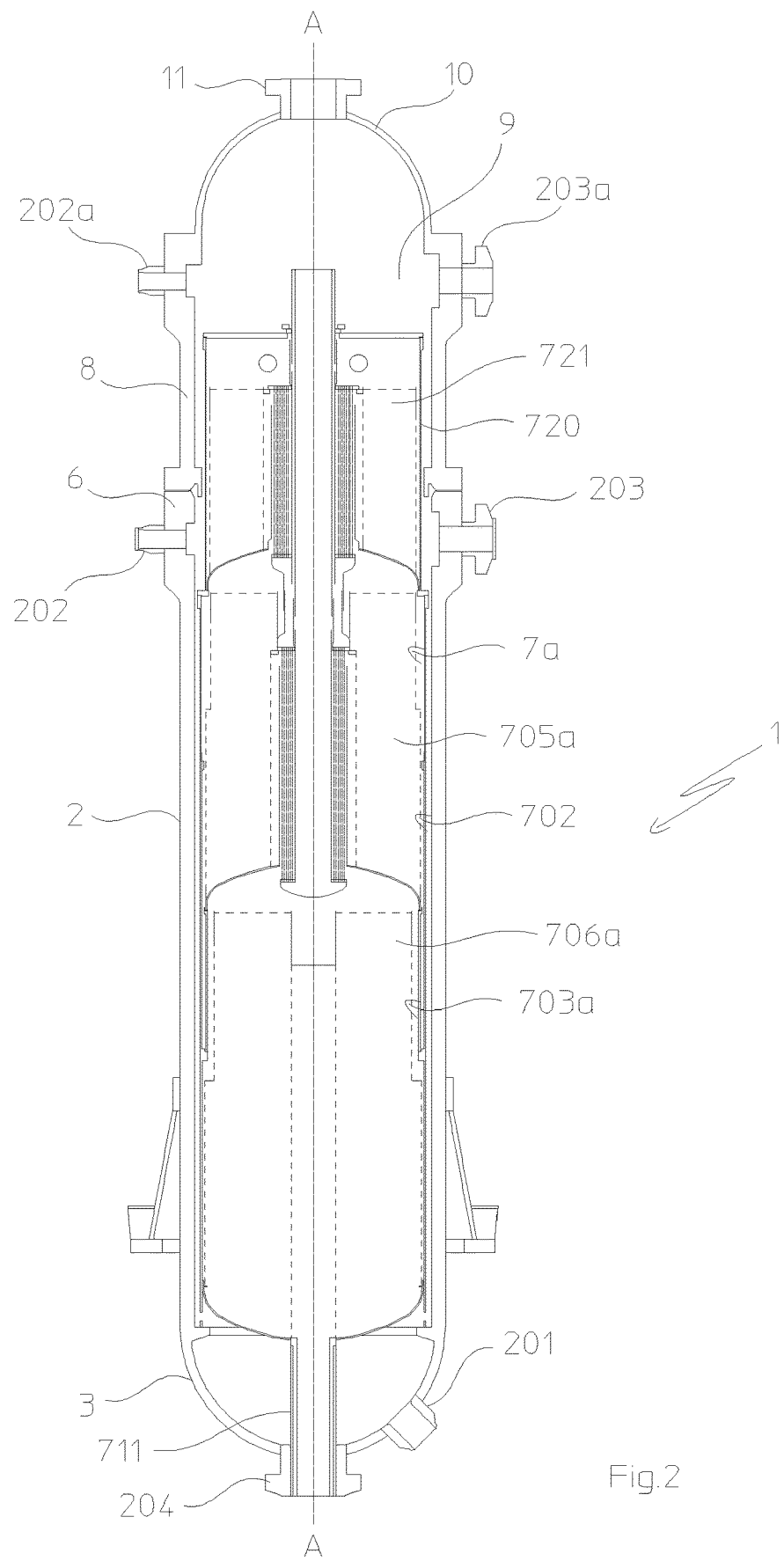
FIG. 2 is a simplified section of the converter of FIG. 1 which has been revamped according to an embodiment of the invention.

FIG. 2 illustrates the converter 1 after a modification according to an embodiment of the invention.

An additional shell 8 is provided over the upper aperture 4 and secured (e.g. bolted) to the flange 6, thus obtaining an axially extended shell of the pressure vessel. Particularly, the axially extended shell includes the original shell 2 and the additional shell 8, which are secured together and form a unique shell.

The additional shell 8 has also a full-diameter upper aperture 9 where a cover 10 is fitted. Said cover 10 may be elliptical or spherical or a flat cover according to various embodiments. The cover 10 may comprise a manhole 11. Preferably the aperture 9 has the same diameter as the original aperture 4. The inputs 202 and 203 may be closed (blinded) and replaced by inputs 202a and 203a performing the same function.

The cartridge 7 is also modified into a modified cartridge 7a by providing a cartridge spool 720 containing a new catalyst bed 721, which replaces the original top bed 704 and becomes the top catalyst bed of the modified cartridge 7a. In this example, the original bed 704 is replaced by a larger bed 721 to maintain a desired load distribution between the catalyst beds.

The modified cartridge 7a delivers an additional room for adding catalyst. It can be noted that this additional room extends over the full diameter of the converter 1, thanks to the fact that the additional shell 8 is secured to the flange 6 which is a full-aperture flange.

The cartridge 7 may be re-arranged so that, in the modified cartridge 7a, the two lower beds (intermediate bed and bottom bed) occupy substantially the same volume as the original three beds.

More in detail, the figures relate to an example where the axial length of the bottom basket 703 is increased. This can be made substantially by replacing or extending the inner collector and outer collector 709, 710. As a result, the modified cartridge 7a includes an axially extended bottom basket 703a. Accordingly, the bottom bed 706a which can be accommodated in the modified basket 703a is also axially extended compared to the original bottom bed 706. It can be said that the bottom basket 703 and bed 706 are axially stretched to a greater length.

Preferably, also the axial length of the intermediate basket 702 is extended in a similar manner, by increasing the length of the corresponding inner collector and outer collector. As a result, an axially extended intermediate bed 705*a* may be accommodated in the converter.

In a multiple-bed embodiment including three or more catalyst beds it is preferred that the last catalyst bed has contains a volume of catalyst substantially equal to the total volume of catalyst contained in the previous catalyst beds.

Preferably, the total length of the axially extended beds 705*a* and 706*a* is substantially equal to the total length of the former three beds. For example, referring to the vertical embodiment of FIG. 2, the top of the intermediate bed 705*a* is substantially at the height of the flange 6 and of the original aperture 4.

The bottom intermediate basket 702, as a consequence of the extension of the underlying basket, is also shifted to a higher elevation.

Figure 3:
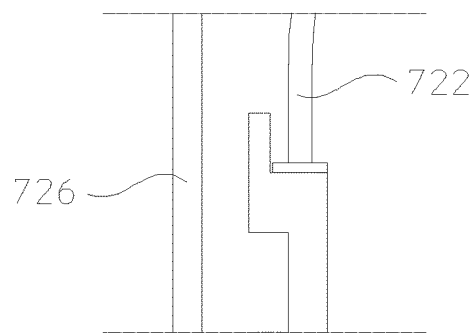
FIG. 3 is a detail of the converter of FIG. 2 showing an embodiment for supporting a catalyst bed.
Figure 3:
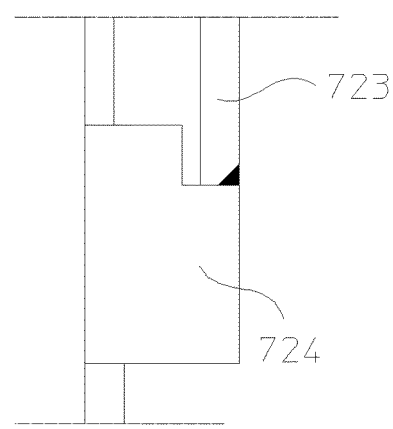
Figure 4:
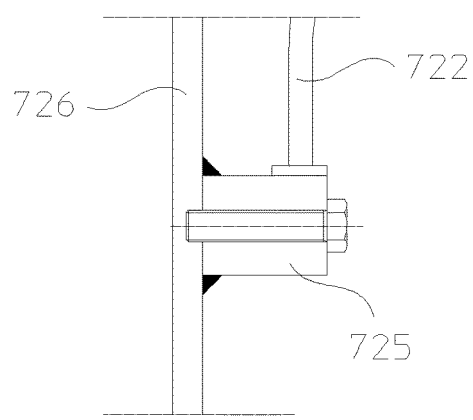
FIG. 4 illustrates an alternative embodiment for the detail of FIG. 3.

FIGS. 3 and 4 illustrate, by way of example, two ways of realizing a bottom support of the shifted intermediate basket 702.

In FIG. 3, an outer collector 722 of the intermediate basket 705 rests on an additional shroud 723 and said additional shroud 723 rests on the existing support ring 724. This embodiment has the advantage of making use of the available support ring 724; the shifted elevation of the intermediate basket is given by the shroud 723.

In FIG. 4, alternatively, a new support ring 725 is provided. Said new ring 725 may be bolted (as in the figure) or welded to a wall 726 of the cartridge 7*a*.

Figure 5:
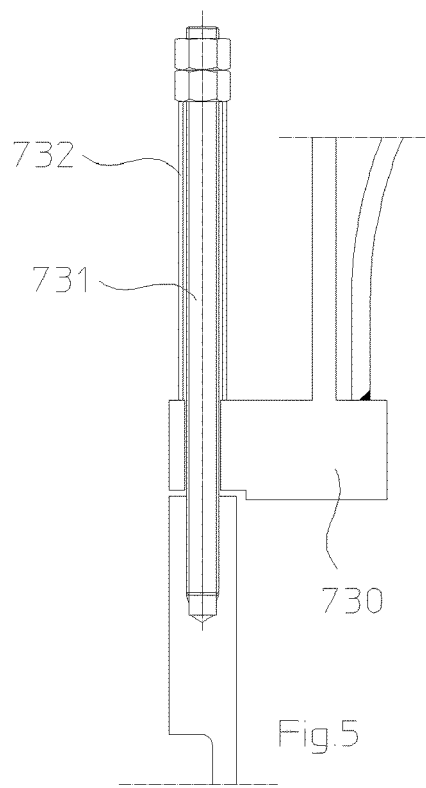
FIG. 5 illustrates another detail of the converter of FIG. 2.

FIG. 5 illustrates an embodiment of the anchoring of the cartridge spool 720 to the structure of the original cartridge 7. In the example, a lower flange 730 of the spool 720 is anchored by means of bolts 731 inserted in pipes 732.

In the example, the cartridge 7 maintains a three-bed setup before and after the revamping. In other embodiments, however, the number of the catalyst beds and/or the arrangement of inter-bed cooling or quenching means may be varied during the revamping.

The invention as above described with reference to a vertical converter is also applicable to a horizontal converter.

The invention claimed is:

1. A method for revamping a catalytic converter, the catalytic converter including a pressure vessel with a main axis and an original catalytic cartridge containing at least one catalyst bed, wherein the pressure vessel includes a shell with a full aperture and includes a removable cover connected to a flange of the full aperture, the original catalytic cartridge being removable through the full aperture;
   the method comprising:
      connecting an additional shell to the flange of the full aperture of the original shell, thus obtaining an axially extended shell of the pressure vessel, thereby extending the pressure vessel along the main axis; and
      providing an axially extended catalytic cartridge having an axially extended room for holding catalyst in the so obtained axially extended shell.

2. The method according to claim 1 wherein providing the axially extended catalytic cartridge includes installing an additional cartridge spool at an end portion of the original catalytic cartridge.

3. The method according to claim 2, wherein the original catalytic cartridge has an end flange with a cover; wherein the cover is removed and the additional cartridge spool is connected to the flange of the original catalytic cartridge.

4. The method according to claim 2, further comprising forming an additional catalyst bed in an end portion of a modified cartridge which is delimited by the cartridge spool.

5. The method according to claim 4, wherein the original catalytic cartridge contains one or more baskets for containing catalyst beds and the method further comprises increasing the axial length of at least one basket of the cartridge.

6. The method according to claim 5, wherein the at least one basket, which is axially extended, includes a last basket of the original catalytic cartridge.

7. The method according to claim 5, wherein increasing the axial length of the at least one basket of the original catalytic cartridge includes axially extending the gas-permeable walls of the basket.

8. The method according to claim 1, further comprising a provision in the axially extended catalytic cartridge of an additional shroud or an additional support ring for at least one catalyst bed of the axially extended catalytic cartridge.

9. The method according to claim 8, wherein the additional shroud or additional support ring are provided to support a catalyst bed which is next to the last catalyst bed.

10. The method according to claim 1, wherein the original catalytic cartridge and the axially extended catalytic cartridge include one or more inter-bed heat exchangers.

11. The method according to claim 1, further comprising:
    removing the original catalytic cartridge from the pressure vessel; and
    installing a new catalytic cartridge within the pressure vessel, the new cartridge having axial length greater than the original catalytic cartridge.

12. The method according to claim 1, wherein the axially extended catalytic cartridge or the new cartridge differs from the original catalytic cartridge for at least one of the following features:
    a number of catalyst beds that can be accommodated in the cartridge;
    a provision or an arrangement of one or more inter-bed heat exchangers; or
    a provision or an arrangement of inter-bed quenching means.

13. The method according to claim 1 wherein the axially extended room for catalyst, provided by the axially extended catalytic cartridge, extends over the full diameter of the pressure vessel of the catalytic converter.

14. The method according to claim 1, further comprising adding catalyst into the axially extended room provided by the axially extended catalytic cartridge.

15. The method according to claim 1, wherein the converter includes a horizontal converter or a vertical converter.

16. The method according to claim 1, wherein the converter includes an ammonia converter.

\* \* \* \* \*